United States Patent [19]

Howard

[11] 4,361,081
[45] Nov. 30, 1982

[54] APPARATUS FOR PROCESSING OILSEED AND GRAIN MASH PRODUCTS

[76] Inventor: James R. Howard, 1317 Edgewater Rd., Abilene, Tex. 79602

[21] Appl. No.: 177,214

[22] Filed: Aug. 11, 1980

[51] Int. Cl.³ ............................................. A47J 27/00
[52] U.S. Cl. .................................... 99/348; 100/93 S; 100/117; 366/88; 366/89; 366/323; 366/146
[58] Field of Search ..................... 99/348, 483; 366/81, 366/88, 89, 90, 322, 319, 323, 324, 146; 425/207, 208; 100/117, 146, 147, 148, 149, 150, 93 S

[56] References Cited

U.S. PATENT DOCUMENTS

| | | | |
|---|---|---|---|
| 1,851,191 | 3/1932 | Lang | 100/147 |
| 1,902,738 | 3/1933 | Tuttle | 100/98 R |
| 2,340,009 | 1/1944 | Meakin | 100/48 |
| 3,108,530 | 10/1963 | Zies | 99/348 |
| 3,253,818 | 5/1966 | Seddon | 366/90 |
| 3,394,649 | 7/1968 | Kemper et al. | 100/43 |
| 3,458,894 | 8/1969 | Wheeler | 366/90 |
| 3,672,641 | 6/1972 | Slaby | 366/90 |
| 3,685,430 | 8/1972 | McBride | 99/235 R |
| 3,822,057 | 7/1974 | Wheeler | 366/89 |
| 3,850,414 | 11/1974 | Scharer | 366/89 |
| 4,003,304 | 1/1977 | Reinhall | 100/117 |
| 4,240,755 | 12/1980 | Frankland | 366/89 |

Primary Examiner—Robert W. Jenkins
Attorney, Agent, or Firm—Hubbard, Thurman, Turner & Tucker

[57] ABSTRACT

An extruder for oilseed products, grain mash, and other materials includes an elongated screw rotatably disposed in a bore formed in a tubular housing. The screw is characterized by a plurality of separate threads of progressively decreasing pitch toward a discharge end of the screw. The separate threads are spaced apart and thread portions of constant pitch include gaps to provide clearance for radially inwardly projecting pins disposed in the housing and projecting into the material flow path for mixing the material to prevent solidification thereof and clogging of the extruder. The screw shaft includes spaced apart annular collars which comprise backflow dams for the material being conveyed through the extruder. The tubular extruder housing is of modular construction and is adapted to be used with various combinations of tubular inserts and a plurality of stacked annular rings forming the extruder bore. The rings are provided with radially extending channels for draining liquid being extruded from the material out of the bore. The extruder is provided with spaced apart electrical resistance heating elements disposed on the housing for heating the material being extruded. Temperature sensors disposed in the mixing pins sense the temperature of the material in the extruder flow path.

12 Claims, 7 Drawing Figures

APPARATUS FOR PROCESSING OILSEED AND GRAIN MASH PRODUCTS

BACKGROUND OF THE INVENTION

1. Field of the Invention

The present invention pertains to a screw type press or extruder for extracting liquid from oilseeds, grain mash and raw agricultural products, and for extruding and cooking various types of such products.

2. Description of the Prior Art

In processing oilseed products, and extraction of liquids from other raw or processed agricultural products it is known to use mechanical screw or auger type presses or extruders for performing liquid extraction and for preparing the material for further treatment or storage.

A number of problems have been encountered with known types of screw extruders including the inability to handle material with high liquid content, jamming or clogging of the material in the extruder due to hardening and resistance to flow of the compacted material as it reaches the discharge end, and mechanical complexity necessitating expensive manufacture and repair.

For example, some known screw type presses or extruders are adapted to have an elongated screw mounted in a tubular housing and supported at one or both ends by bearings. The various applications to which screw type extruders are applied quite often produce a considerable amount of heat and pressure on the material which results in damage to the bearings and other associated drive mechanism in the flow path of the material. Moreover, in the extrusion and cooking of grain mashes and oilseed protein products such as corn, soybeans, cottonseed and the like with screw type extruders a hard, tough semi-plastic mass is produced which can overload or jam the extruder mechanism resulting in the shut down of the entire process system in connection with which the extruder is being used. Prior art screw type extruders have proven to be difficult to disassemble and clean making them further unattractive for use in complex processing systems such as the production of alcohol in large quantities from grain products.

Another longstanding problem associated with screw type extruders pertains to proper control of the progressive increase in pressure exerted on the material as it is conveyed through the apparatus to perform liquid extraction and progressively compact and expel the material at the discharge end in a desired condition suitable for transportation and storage or further processing.

A still further problem in the art of mechanical screw type extruder-cookers pertains to proper control of the heating of the material durong start up and during steady state operation.

Known designs of screw type extruders also, generally speaking, require a considerable amount of mechanical power and must be operated at relatively high rotative speeds for processing oilseed products in the so called cooking operations whereby the material being processed is compacted and heated by external means or by friction generated in the extruder itself.

Known types of screw extruder-cookers are also designed to operate with partially processed products for removing a high percentage of liquid. Such equipment is not suitable or cost effective for use in connection with alcohol production processes for producing gasohol, for example.

Known screw type extruders for processing oilseed products, grain used in alcohol production, and other viscous plastic materials have generally been designed for specific uses in connection with only one type of material and accordingly, heretofore known equipment has not enjoyed the versatility that the improvements represented by the present invention provide.

SUMMARY OF THE INVENTION

The present invention provides an improved screw type apparatus which is adapted for operation in processing oilseed protein products, grain mashes and other raw agricultural products to extract liquids therefrom as well as for operation as a dryer and a cooker for certain materials. It will be appreciated that the present invention may be used for a variety of purposes and will be referred to basically throughout the specification as an extruder for the sake of clarity and consistency.

The present invention also provides an improved screw type extruder apparatus which is operable to extract liquid from a wide variety of materials having a substantial range of moisture or liquid content and whereby the material may be processed to an acceptable condition to permit transportation and storage without spoilage. The present invention is particularly suitable for use in extracting liquid from grain mashes used in alcohol production, which liquid can be converted to fuel for internal combustion engines or other energy conversion processes. Concomitant with the liquid extraction the mash is dried to a suitable degree to permit transportation and storage without spoilage. Those skilled in the art will recognize that one preferred embodiment of the present invention may also be used at various stages in processing material such as corn and other grain products used for alcohol distillation. The embodiment of the present invention referred to above may also be used to extract oil and liquids from oilseed products, kernels, nuts and other proteinaceous materials. Another embodiment of the present invention pertains to an extruder-cooker which more efficiently performs starch to sugar conversion in materials such as corn, maize, wheat or any raw agricultural product which has a high starch content.

The present invention advantageously employs an improved screw conveyor member in combination with a tubular housing having an outer cylindrical barrel and a removable tubular insert together with a plurality of annular rings stacked side by side and forming together with the tubular insert the extruder bore. The aforementioned rings are provided with circumferentially spaced and radially extending channels to permit drainage of liquid squeezed from the material being conveyed through the apparatus and compressed by the screw. The cross sectional area of the channels in the respective rings is progressively reduced in the direction of flow of the material through the extruder bore whereby the material being extruded is not forced out of the bore through the channels as the pressure on the material is increased. The tubular housing is advantageously provided of modular construction whereby the length of the tubular insert and the number of rings may be varied according to the type of material being processed or the moisture content thereof.

The present invention also advantageously includes an improved extruder screw or auger which is provided with a thread, respective portions of which are of a different pitch or lead angle which is progressively decreased toward the discharge end of the screw to provide for improved control over the passage of the material being compressed and resulting in lower power consumption by the extruder. The screw shaft is also provided with a plurality of spaced apart annular shoulders which function as backflow dams to improve the pressure gradient along the bore of the extruder and reduce the tendency for backflow of stagnation of the material in the flow path between the screw threads.

A still further advantageous aspect of the present invention pertains to means for reducing the tendency of the material being extruded to jam and solidify into a hardened mass within the screw flow path. It has been determined that by providing a plurality of spaced apart pinlike projections which are interposed between gaps in the screw threads and which project into the spiral flow path formed between the screw and the tubular housing that an increase in the turbulence and mixing of the material being conveyed through the apparatus is provided which prevents solidification and clogging of the extruder.

The construction of the extruder of the present invention is uncomplicated and provides for reliable operation as well as relatively easy assembly and disassembly. Accordingly, the extruder of the present invention is particularly advantageous for use in certain applications which cannot cost justify more complex mechanical presses and extruders.

DETAILED DESCRIPTION OF THE PREFERRED EMBODIMENTS

In the description which follows like parts are indicated with the same reference numerals, respectively. In the drawings certain elements may be exaggerated in scale in order to clarify the features of the invention.

Figure 1:
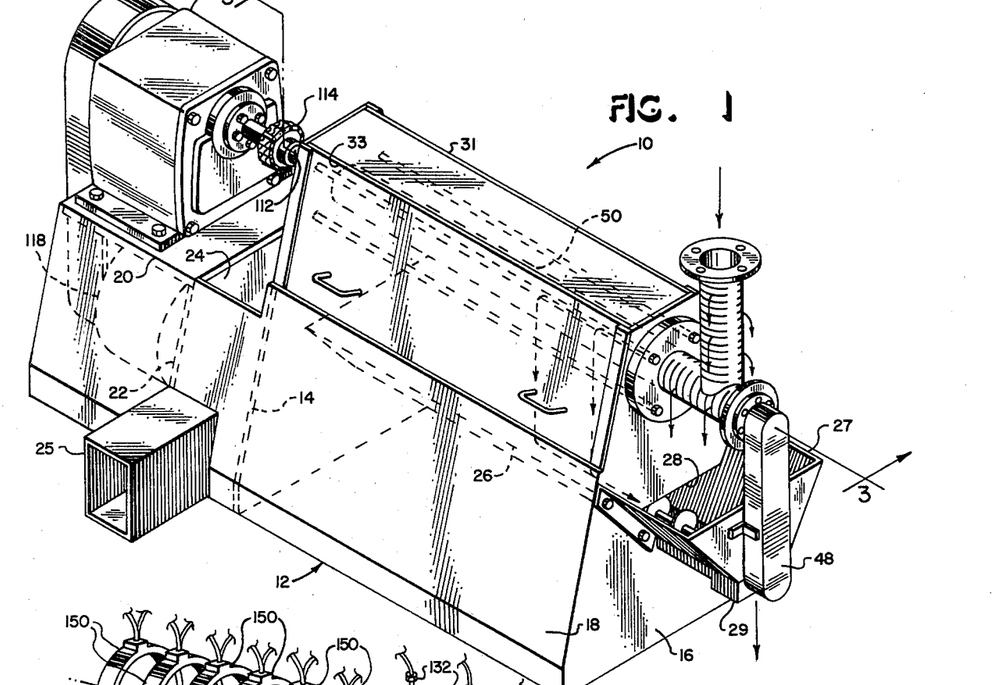
FIG. 1 is a perspective view of the exterior of the complete extruder unit of the present invention.
Figure 3:
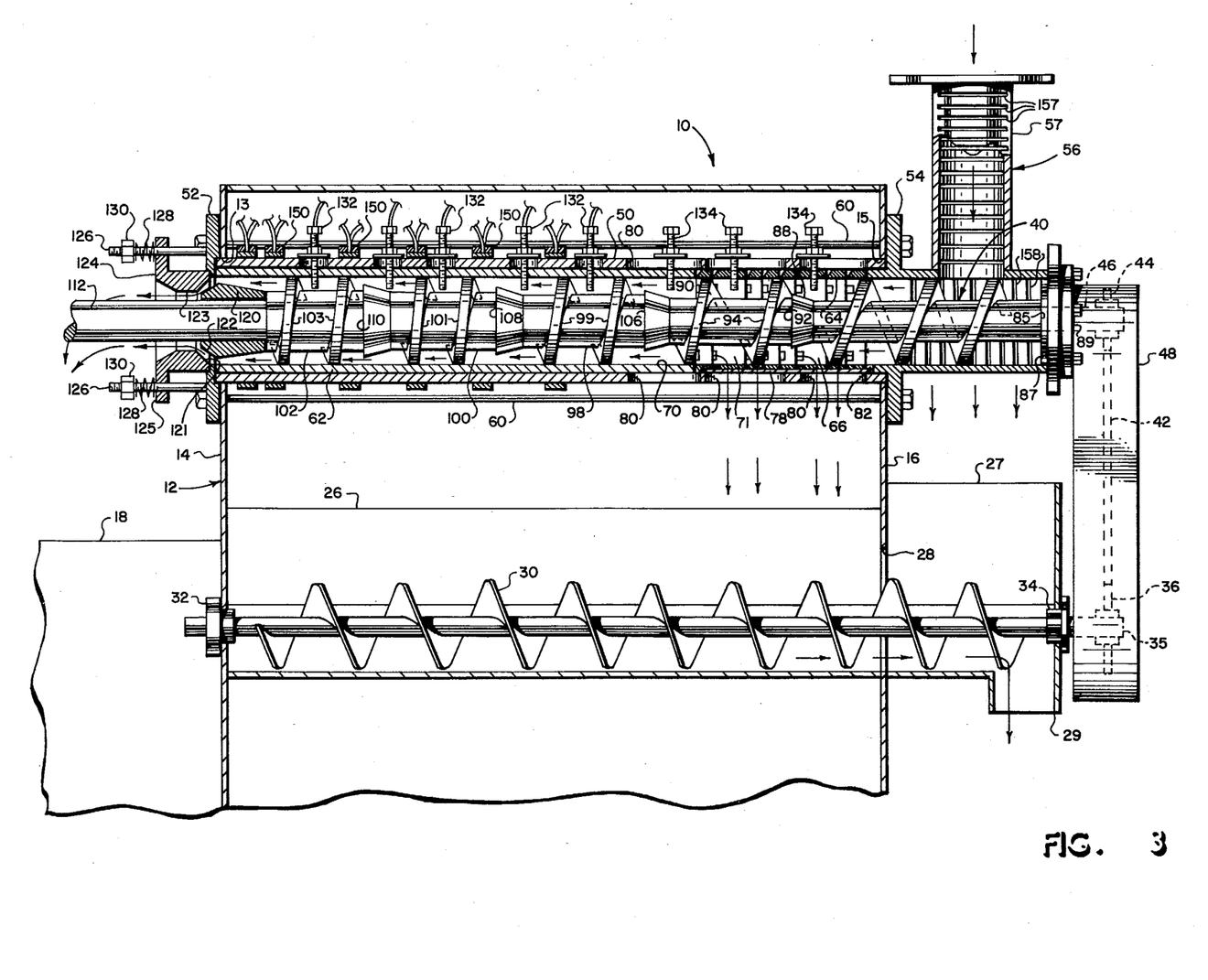
FIG. 3 is a longitudinal section view taken substantially along the line 3—3 of FIG. 1.

Referring to FIGS. 1 and 3, the apparatus of the present invention is characterized by a screw type extruder generally designated by the numeral 10. The extruder 10 includes a frame 12 having speed apart transverse plate members 14 and 16 and longitudinal side walls 18 forming an enclosure. The side walls 18 extend beyond the plate 14 and are interconnected by a deck member 20 and a third plate 22 spaced from the plate 14 to form a hopper 24. In FIG. 1 there is shown an outlet duct 25 which extends from the hopper 24 for a purpose to be described further herein. Removable doors 31 and 33 are slidably mounted in guides on the side walls 18 and provide access to the enclosure formed between the side walls and the plates 14 and 16.

Within the enclosure formed between the side walls 18 and the spaced apart plates 14 and 16 there is provided a trough 26 having a portion 27 extending from the plate 16 on the exterior of the frame 12. An opening 28 in the plate 16 interconnects the trough portions 26 and 27. The trough portion 27 is provided with a bottom outlet opening 29 for draining liquid and fine particles of material extracted from the material being processed by the extruder 10. An elongated screw conveyor member 30 is disposed along the bottom of the trough 26 and is rotatably mounted in spaced apart bearings 32 and 34 as shown in FIG. 3. A shaft portion 35 of the screw member 30 extends through the bearing 34 and includes a chain sprocket 36 or the like mounted thereon. The screw member 30 is rotatably driven in conjunction with a second elongated screw shown in FIG. 3, and generally designated by the numeral 40, by a suitable endless chain 42 trained around the sprocket 36 and a sprocket 44 disposed on a shaft portion 46 of the screw 40. The chain drive mechanism is disposed within a suitable housing 48 which is removably secured to an end wall of the trough portion 27 as shown in FIG. 1.

Figures 2, 4:
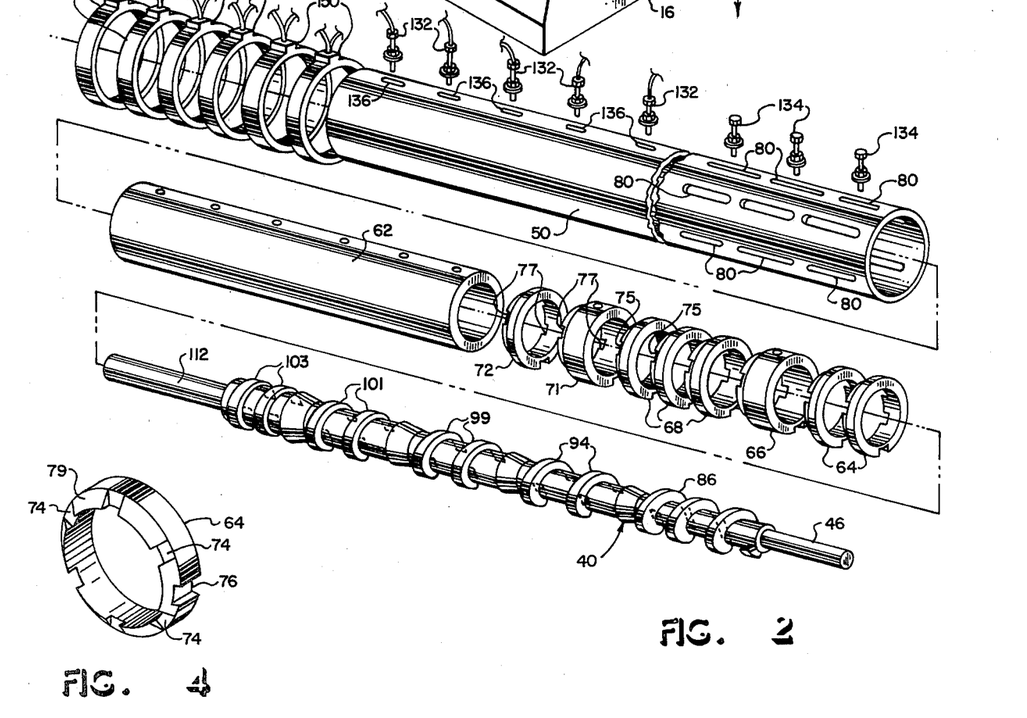
FIG. 2 is a perspective view of a number of the major components of the extruder of the present invention shown disassembled.
FIG. 4 is a perspective view of one of the annular rings showing the liquid drain channels.

Referring to FIGS. 2 and 3, the improved extruder of the present invention is further characterized by an elongated cylindrical tubular housing 50 adapted to be mounted on the frame 12 and extending between the plates 14 and 16 through suitable openings 13 and 15, respectively. The housing 50 is secured between circular flanges 52 and 54, the latter flange being integrally formed with an inlet conduit member 56 including a vertical section 57 and a substantially horizontal section 58. The flanges 52 and 54 are suitably held in assembly with the housing 50 and the frame 12 by a plurality of elongated bolts 60.

Disposed within the housing 50 in close fitting but slidably removable relationship is a tubular sleeve 62 extending over more than half of the length of the housing and held therein at one end by the flange 52. Also disposed within the housing 50 are a plurality of annular rings 64, 66, 68, 71 and 72. The rings 64, 66, 68, 71 and 72 are all proportioned to have an outside and inside diameter approximately the same as the tube 62 whereby in assembly within the housing 50, as shown in FIG. 3, the rings and the tube form a bore 70 extending through the housing and opening to the inlet conduit portion 58.

Referring to FIG. 4, by way of illustration a ring 64 includes a plurality of circumferentially spaced apart and radially extending channels 74. The channels are provided to be of different depths in the different rings and are made progressively shallower to reduce the cross sectional flow area of the channels in the rings which are closer to the tube 62 in the extruder 10. For example, in a preferred embodiment of the present invention the channels in all of the rings would be approximately 25 millimeters in width. However, the channels 74 in the rings 64 and the channels in the rings 66 would be approximately 1 millimeter deep, the channels 75 in the rings 68 would be approximately 0.75 millimeters deep and the channels 77 in the rings 71 and 72 would be approximately 0.25 millimeters deep. The channels 74, 75 and 77 form passages which are provided for draining liquid from the material being conveyed through the bore 70 by the screw 40 and compressed therein. The channels 74, 75 and 77 are provided to have progressively decreasing effective flow areas corresponding to the increase in pressure of the material within the extruder bore to prevent expulsion of a substantial amount of the solid material itself through the channels. The specific number and arrangement of the rings 64, 66, 68, 71 and 72 as shown in FIGS. 2 and 3 is for illustrative purposes only. The number of rings having a particular channel depth may be varied as well as the total number of rings used in the extruder assembly in accordance with the type of material being extruded and the anticipated moisture content thereof.

As shown by way of example for one of the rings 64 in FIG. 4, each ring is provided with a beveled transverse end face 79 to facilitate drainage of liquid away from the rings when they are stacked in end to end relationship as shown in the drawing FIGS. 2 and 3. Moreover, each ring is provided with a longitudinally extending keyway 76, as shown by way of example in FIG. 4, for aligning and retaining the ring against rotation within the housing 50. An elongated key 78, FIG. 3, extends through the keyway provided in each of the rings and also extends into a keyway 82 formed in the flange 54. As shown in FIG. 2 and FIG. 3, the housing 50 is provided with a plurality of elongated slots 80 which provide openings for draining the liquid and fine particles of material which flow through the channels in the respective rings 64, 66, 68, 71 and 72 and drain into the trough 26 as indicated by the arrows in FIG. 3.

Referring further to FIGS. 2 and 3, the screw 40 is characterized by an elongated shaft including a first portion 84 disposed within the conduit 58 and extending into the portion of the bore 70 defined by the rings 66 and 68. The shaft portion 84 includes a single continuous screw thread 86 which extends substantially toward a frusto conical portion 88 which interconnects the shaft portion 84 with a shaft portion 90 of larger diameter. The opposite end of the shaft portion 84 forms a transverse bearing surface 85 at the juncture with the shaft portion 46. The surface 85 bears against an end face 87 of a removable cover member 89 mounted on the inlet conduit 56 and including a bore through which the shaft portion 46 extends. The frusto conical portion 88 also forms an annular transverse should 92 comprising a back flow dam whose function will be explained in further detail herein. The second shaft portion 90 includes further screw threads 94 which are provided with an interruption or gap therebetween and are spaced from the screw thread 86 as shown in the drawings. The screw 40 is also provided with shaft portions 98, 100 and 102 which are progressively larger in diameter. The shaft portion 98 includes screw threads 99 which are of the same pitch and are provided with a gap therebetween. In a similar manner the shaft portion 100 is provided with screw threads 101 of the same pitch and with a gap or interruption therebetween. Finally, the shaft portion 102 is provided with screw threads 103 which are of the same pitch and also are provided with a gap therebetween.

The transitions from the shaft portions 94, 98, and 100 to the next larger shaft portions, respectively, are provided by respective frusto conical surfaces and respective annular shoulders 106, 108 and 110 which also function to minimize back flow of the material being conveyed through the bore 70 by the screw threads of the screw 40. As will be appreciated from viewing the drawing figures the threads 86, 94, 99, 101 and 103 are of relatively thick cross section and are dimensioned for a relatively close fit within the bore 70. Accordingly, the screw 40 is rotatably mounted within the bore 70 and bears against the bore wall along the circumferential surfaces of the respective threads. However, it has been determined that in operation the screw 40 tends to be self centering within the bore and the material being compressed serves as a lubricant between the circumferential surfaces of the threads and the bore wall.

Referring particularly to FIGS. 1 and 2 the screw 40 includes a shaft portion 112 which extends from what will be referred to as the discharge end of the extruder and is coupled by means of a suitable coupling 114 as shown in FIG. 1, to a reduction gear drive 116 which is suitably driven by an electric motor or the like 118 mounted within the enclosure beneath the gear drive 116. It will be appreciated that the particular drive arrangement of the extruder 10 illustrated in FIGS. 1 through 3 may be varied. For example, the shaft portion 46 may be extended beyond the housing 48 and suitably coupled to a prime mover whereby the extruder may be driven from the inlet end as opposed to the arrangement illustrated.

Referring again to FIG. 3, a collar 120 is fixedly mounted on the shaft portion 112 beyond the screw threads 103 in the direction of flow of the material to be extruded. The collar 120 includes an axially sloping surface 122 which together with a cooperating surface 121 on a member 124, shown in FIG. 3, forms a variable area discharge opening for controlling the pressure exerted on the material being conveyed through the bore 70 of the extruder housing by the screw 40. The member 124 includes an annular flange 125 which is supported by spaced apart rods 126 extending from the flange 52 as shown in FIG. 3. The member 124 is axially slideable on the rods 126 and is biased toward the collar 120 by coil springs 128 disposed around the respective rods 126 and retain thereon by nuts 130. Accordingly, the biasing force exerted on the member 124 by the springs 128 may be adjusted by the nuts 130 whereby the pressure exerted on the material being conveyed through the bore 70 may be suitably controlled.

Figures 5, 7:
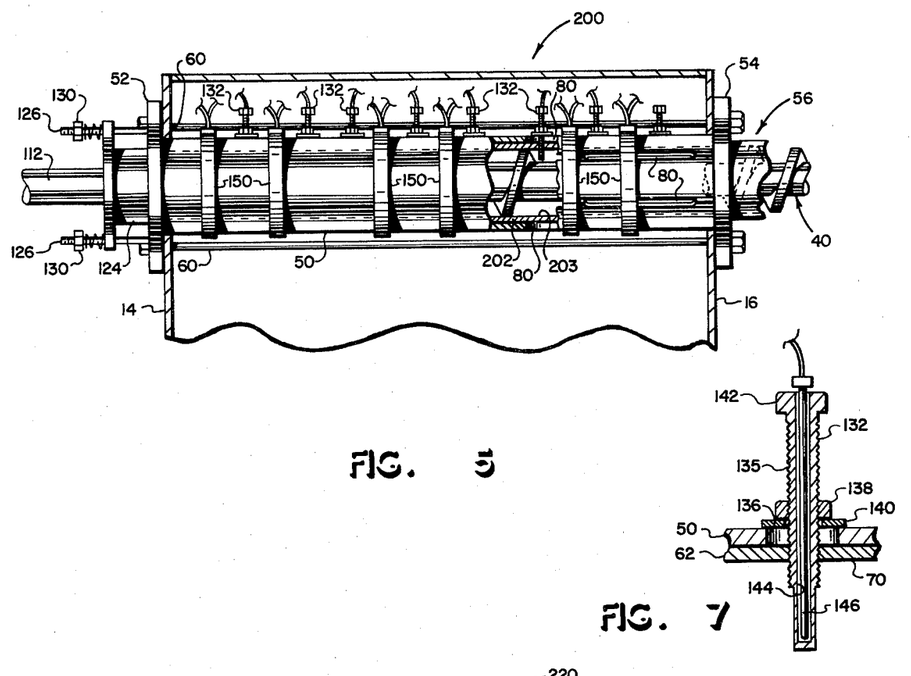
FIG. 5 is a longitudinal side elevation, partially sectioned, of an alternate embodiment of the present invention.
FIG. 7 is a detailed section view of one of the mixing pins showing a temperature sensor disposed therein.

A particularly advantageous aspect of the present invention is realized by the provision of a plurality of cylindrical pins desigated by the numeral 132 and 134 as shown in FIGS. 2, 3 and 7 of the drawings. The pins 132 and 134 are spaced along the housing 50 and project radially inwardly through the tube 62 and respective rings 66 and 71 into the bore 70 at spaced intervals coincident with the gaps between the respective threads on the screw 40. As shown in the drawings, pins 132 are positioned in the gaps between the respective sets of threads 99, 101 and 103. Additional pins 132 are also disposed in the gaps between each of the separate threads in the respective sets of threads 99, 101 and 103. The pins 134 are also similarly spaced between the respective threads 94 as well as between the set of threads 94 and the set of threads 99 and between the continuous threads 86 and one of the threads 94.

Referring particularly to FIG. 7, one of the pins 132 is illustrated in detail. The pin 132 includes an externally threaded portion 135 to provide for threadedly securing the pin in a tapped hole formed in the tube 62. The pin 132 extends through an opening 136 in the housing 50 and is locked in position by a nut 138 engaging a washer 140 briding the opening 136. The pin 132 is preferrably formed with a head 142 which may be adapted to be engaged by a wrench for holding the pin in position while the nut 138 is tightened to lock the pin in the preferred position extending into the bore 70. As shown in FIG. 7, each of the pins 132 is provided with an elongated axial bore 144 in which is disposed a temperature sensor 146 such as a thermocouple. The pins 134 are similarly constructed and secured to the tube 62 and the respective rings 66 and 71 but are not provided with the temperature sensor 146.

A long standing problem in the art of screw type extruders has been the problem of jamming and clogging of the material being extruded under conditions of pressure and temperature normally encountered in drying and cooking operations. The pressure is progressively increased on the material as it flows toward the discharge end of the extruder and the material tends to remain relatively undisturbed or unmixed as it flows through the substantially spiral channel formed between the threads of the extruder and the bore wall of the housing in which the screw is disposed. Accordingly as the material is heated and compacted it tends to solidify into a hard mass which ceases to flow thereby resulting in jamming and shutdown of the extruder. However the design of the screw 40 with the spaced apart threads and the provision of the pins 132 and 134 provide for suitable turbulence and mixing of the material being extruded as the material progresses through the bore 70. It will be appreciated by those skilled in the art that the number of pins and the axial position thereof may be varied according to the type of service to which the extruder is being applied and the pressures and temperatures encountered.

The embodiment of the extruder shown in FIGS. 1 through 3 is adapted for processing corn and other forms of grain mash used in alcohol distillation processes. In such applications it is desirable to provide an external heat source for heating the material being extruded, particularly during start up of the extruder. Also, depending on the pressure and the moisture content of the material being extruded, it is sometimes desirable to provide a continuous source of heat for providing the extruded material with the desired physical characteristics upon being discharged from the extruder. Accordingly, the extruder 10 is provided with a plurality of spaced apart annular electrical resistance type heating elements 150 disposed on the housing 50. The heating elements 150 may be suitably connected to a source of electric power, not shown, through a suitable control system, also not shown, to provide a controlled amount of heating to the housing 50 and the material being extruded therethrough. Accordingly, the temperature sensors 146 disposed in the pins 132 may be used to sense the temperature within the bore 70 at the various positions of the pins for causing the aforementioned control system to vary the amount of heat applied by the heating elements 150. Therefore, with the arrangement of the mixing pins 132 being in intimate contact with the material being extruded, close control of the temperature of the material may be obtained with the use of the heating elements 150 and the temperature sensors 146.

The heating elements may also be of a type which include cooling coils adapted to circulate a suitable medium such as water therethrough whereby further control of the temperature of the medium being extruded may be obtained. Accordingly, under operating conditions where temperatures generated by friction of the material being extruded exceeds that which is desired for the properties of the material after discharge from the extruder a combination heating and cooling coil will provide for suitable control of the temperature of the extrusion product.

The extruder 10 is also particularly adapted for extracting liquid from mash used in the distillation of alcohol, which liquid may be further processed into fuel suitable for compression ignition engines as well as other energy conversion processes. In the operation of the extruder 10 a moisture laden mash is introduced into the inlet conduit 56 from a still or other suitable storage vessel in a continuous manner with the screw 40 and the screw conveyor 30 being continuously rotatably driven by the motor 118 through the reduction gear drive 116. The conduit portions 57 and 58 of the inlet conduit are provided with a plurality of slots 157 and 158, respectively, whereby liquid that would normally drain from the material being introduced into the inlet conduit will flow out through the slots and into the trough portion 27 and out through the bottom opening 29. The material being introduced into the inlet conduit 56 will be progressively conveyed along the substantially spiral channel formed between the screw threads 86 and the bore formed by the rings 64 and the interior of the inlet conduit 58. As material is continuously introduced into the inlet conduit 56 it will be forced along the bore 70 by the successive screw threads 86, 94, 99, 101 and 103 and out through the opening 123 in the member 124. The extruded material discharged from the outlet opening 123 will fall into the hopper 24 formed between the plates 14 and 22 and may be removed from the hopper continuously by suitable means not shown such as, for example, a screw conveyor disposed within the duct 26.

The maximum pressure exerted on the material being extruded is controlled by the member 124 and the bias force exerted thereon as determined by the compression on the springs 128. The pressure exerted on the material increases progressively from the inlet end of the extruder toward the discharge end and, accordingly, the pitch of the screw threads 94, 99, 101 and 103 is progressively reduced to provide improved mechanical efficiency of the extruder and reduce the power requirements therefor. As the pressure on the material being extruded is increased in the region delimited by the screw threads 86 and 94 a substantial amount of liquid is extracted from the material and flows through the channels in the rings and into the trough 26 together with some of the finer particles of the material which are unavoidably forced through the ring channels. The screw conveyor 30 continuously conveys the liquid and fine particles of mash from the trough portion 26 into the trough portion 27 and through the outlet opening 29 whereby liquid may be conducted into a holding tank, not shown, or directly to further processing apparatus also not shown.

Many materials which are extruded to extract liquids therefrom or to prepare the material for further processing are subject to considerable compaction and have a tendency to solidify at the temperatures and pressures required in the extrusion process. The distribution of pressure through the extruder is somewhat difficult to control without causing the material to clog or jam the extruder on the one extreme and, if too little pressure is applied, inadequate liquid extraction is suffered. In accordance with the present invention the separate sets of screw threads suitably spaced apart and having progressively decreasing pitch together with the progressive increasing diameter of the screw shaft portions to reduce the cross sectional flow area in the bore 70 provides for improvements in the flow and compaction of the material being extruded. The material flow characteristics and the pressure gradient are also enhanced by the annular surfaces 92, 106, 108 and 110 forming the so called backflow dams. Moreover, the provision of the pins 132 and 134 projecting radially into the spiral flow path formed by the respective sets of screw threads eliminates the tendency for the material being extruded to solidify or form hard chunks or balls which will clog the screw and require disassembly of the machine to clean the flow path. Also, the privision of the temperature sensors 146 in the pins 132 in close proximity to the material being extruded results in improved temperature control when the heating elements 150 are being utilized or when combination heating and cooling elements are being used.

An alternate embodiment of an extruder apparatus according to the present invention is illustrated in FIG. 5 and generally designated by the numeral 200. The extruder 200 is primarily adapted for extruding and cooking certain materials such as soybeans and other proteinaceous materials which are to be converted into a meal or flour or other solid form for storage, transportation and use.

The extruder 200 includes the cylindrical housing 50 mounted between the flanges 52 and 54 of the frame 12. However, the tube 62 in the embodiment of FIG. 1 has been replaced by an elongated tube 202 which extends the length of the housing 50 and includes a cylindrical bore 203 but does not include any fluid outlet channels. The extruder 200 further includes the screw 40 and the pressure control member 124 disposed at the discharge end of the bore 203. The extruder 200 is substantially identical to the extruder 10 except for the replacement of the tube 62 and the rings 64, 66, 68, 71 and 72 with the tube 202. Furthermore, in the extruder 200 the heater elements 150 are spaced along substantially the entire length of the housing 50 and closer to the inlet conduit 56. Moreover, additional pins 132 equipped with temperature sensors are employed in place of some of the pins 134 in the embodiment of FIG. 1. The pin nearest the inlet end of the extruder 200 may be one of pins 132 or a pin 134 as shown. It will be appreciated that the extruder 200 could be provided with a one piece housing having a bore equal to the bore 203 in place of the housing 50 and tube 203 extending the length of the housing.

The embodiment of the present invention illustrated in FIG. 5 is particularly adapted for heating and compacting a material which is already substantially dry or from which it is not desired to extract any liquids. For example, the extruder 200 can be used in processing soy flour and the like. In the extruder 200 the heating element 150 preferably would include cooling coils for more precise temperature control which is desired in the extrusion-cooking process.

The operation of the extruder 200 is similar in most respects to the operation of the extruder 10 in that material is introduced substantially continuously into the inlet conduit 56 and the screw 40 is continuously rotated to convey the material toward the discharge end whereby it is heated and compacted by the action of the screw with additional heat being supplied by the heater elements 150 as needed to control the temperature of the material within the desired limits. The material is discharged through the discharge opening provided in the member 124 in the same manner as in the operation of the extruder 10. The provision of additional pins 132 with temperature sensors 146 disposed therein provides for control of the temperature of the material being extruded over a substantial portion of the flow path of the material while it is within the housing 50.

Figure 6:
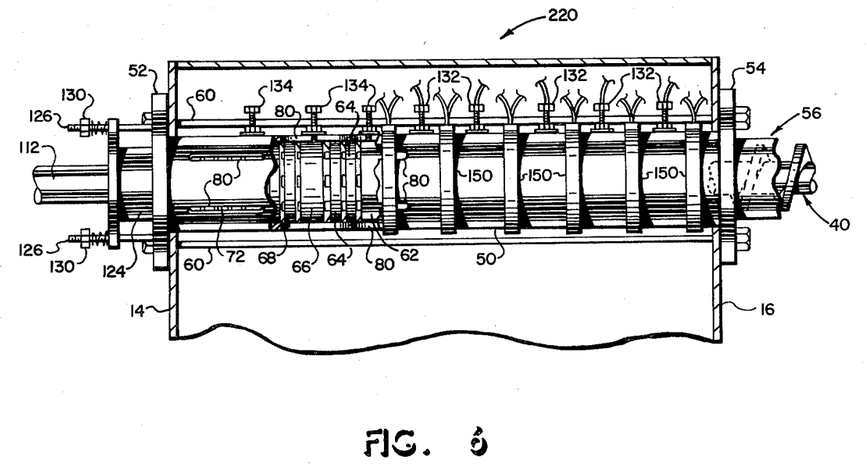
FIG. 6 is a longitudinal side elevation, partially sectioned, of a second alternate embodiment of the present invention.

A second alternate embodiment of the present invention is illustrated in FIG. 6 of the drawings and generally designated by the numeral 220. The apparatus shown in FIG. 6 is primarily an extruder for extracting oil from oilseed products. In the extruder 220 the housing 50 together with the tube 62 is reversed with respect to the screw 40. That is, the tube 62 is disposed adjacent the inlet conduit 56 and extends more than half the length of the housing 50 toward the discharge end pressure control member 124. A suitable assemblage of rings 64, 66, 68, 71 and 72 are stacked between the tube 62 and the flange 52 to provide for drainage of oil from the material being extruded.

In the extrusion of certain oilseed products such as soybeans it is preferred to heat the material followed by increased compaction to extract more oil from the material. Accordingly the heater elements 150 are disposed near the inlet conduit 56 in the extruder 220 so that the material is heated first as it enters the flow path of the extruder. Pins 132 and 134 are spaced along the screw 40 in a manner similar to the embodiments of FIG. 1 and FIG. 5.

It will be appreciated that the arrangement and number of rings 64, 66, 68, 71 and 72 can be varied according to the material being processed in the extruder 220 and according to the maximum pressure being exerted on the material by the pressure control member 124 whereby the desired amount of liquid may be extracted from the material before it is discharged from the extruder and without any substantial discharge of solid particles of material with the liquid through the passages formed by the channels in the rings.

The various embodiments of the present invention described hereinabove may be fabricated from conventional metals such as relatively free machining steel and low cost structural steel material. Moreover, the design of the screw threads of the screw 40 provide suitable bearing means for supporting the screw within the bore formed by the tubular inserts and the rings whereby separate bearings disposed at each end of the screw are not required. For substantially all applications of the extruder of the present invention the material being conveyed by the screw 40 provides suitable lubrication between the circumferential surface of the screw threads and the bore wall of the housing in which the screw is disposed. However, it has been determined that in operation the screw tends to be self centering in the bore and no substantial radial loads are exerted thereon.

It will further be appreciated from the foregoing description that the modular construction of the extruder of the present invention provides for adapting the extruder to various uses, as disclosed, and for operation with various materials. In particular, the present invention has been determined to be superior for use in various stages of alcohol distillation processes and in applications for reclaiming liquids from alcohol distillation materials, which liquids may be used as fuel source material.

Those skilled in the art will recognize that various detailed modifications in the construction of the present invention may be made without departing from the scope or spirit of the invention as defined in the appended claims.

What I claim is:

1. An extruder for processing material such as oilseed products, grain mash and the like and comprising:
   an elongated housing including means defining a substantially continuous cylindrical bore;
   inlet conduit means in communication with said bore;
   means forming a discharge opening at one end of said bore;
   an elongated rotatable screw conveyor disposed in said bore and including screw thread means disposed on a cylindrical shaft and forming a substantially spiral flow path for said material; and
   a plurality of spaced annular surfaces formed on said shaft at axially spaced gaps in said thread means and facing said one end of said bore to provide resistance to flow of material toward said inlet conduit from said one end of said bore.

2. An extruder for processing material such as oilseed products, grain mash and the like and comprising:
   an elongated housing including means defining a cylindrical bore;
   inlet conduit means in communication with said bore;
   means forming a discharge opening at one end of said bore opposite said inlet conduit means; and
   an elongated rotatable screw conveyor disposed in said bore and including screw thread means forming a substantially spiral flow path for said material, said screw thread means including a plurality of separate thread portions of a different pitch disposed around respective cylindrical shaft portions of said conveyor, the diameters of said respective shaft portions being different for said thread portions of different pitch, the pitch of said thread portions decreasing progressively toward said one end of said bore, and the diameter of said respective shaft portions increasing with decreasing pitch of said thread portions.

3. An extruder for processing material such as oilseed products, grain mash and the like and comprising:
   an elongated housing including means defining a cylindrical bore;
   inlet conduit means in communication with said bore;
   means forming a discharge opening at one end of said bore opposite said inlet conduit means; and
   an elongated rotatable screw conveyor disposed in said bore and including screw thread means forming a substantially spiral flow path for said material, said screw thread means including a plurality of separate thread portions of a different pitch disposed around respective cylindrical shaft portions of said conveyor, the diameter of said respective shaft portions being different for said thread portions of different pitch, said respective shaft portions of different diameter being interconnected by shaft portions forming frustoconical surfaces.

4. The invention set forth in clalim 3 wherein:
   at least some of said shaft portions forming said frustoconical surfaces include a transverse annular surface delimiting the base of said shaft portions and facing toward said one end of said bore.

5. An extruder for processing material such as oilseed products, grain mash and the like and comprising:
   an elongated housing including means defining a cylindrical bore;
   inlet conduit means in communication with said bore;
   means forming a discharge opening at one end of said bore opposite said inlet conduit means; and
   an elongated rotatable screw conveyor disposed in said bore and including screw thread means forming a substantially sprial flow path for said material, said screw thread means including a plurality of separate thread portions of a different pitch disposed around respective cylindrical shaft portions of said screw conveyor, the diameter of said shaft portions being different for said thread portions of different pitch; and
   means on said shaft portions forming a plurality of spaced apart annular surfaces facing said one end of said bore.

6. The invention set forth in claim 5 wherein:
   said annular surfaces are formed at said gaps between said separate thread portions.

7. An extruder for processing materials such as oilseed products, grain mash, and the like and comprising:
   an elongated housing including means forming a cylindrical bore therein;
   inlet conduit means in communication with said bore;
   means forming a discharge opening at one end of said bore opposite said inlet conduit means;
   an elongated rotatable screw conveyor disposed in said bore and forming a substantially spiral flow path for material through said bore, said conveyor comprising a plurality of separate thread portions of different pitch formed on respective axially spaced portions of a conveyor shaft, the pitch of the threads of said thread portions decreasing progressively toward said one end of said bore, and the diameter of said respective shaft portions increasing progressively toward said one end of said bore, and means comprising a plurality of spaced apart radially inwardly extending projections supported on said housing and extending into said bore and said flow path for causing material to mix as it passes along said flow path and to prevent clogging of said flow path by said material.

8. The invention set forth in claim 7 wherein:
   at least some of said projections are disposed betweeen said thread portions of different pitch.

9. The invention set forth in claim 7 wherein:
   said thread portions of different pitch include an interruption in said thread forming an axially extending gap to provide clearance for respective ones of said projections.

10. The invention set forth in claim 7 together with:
    temperature sensing means disposed in at least one of said projections for sensing the temperature of material flowing past said one projection in said flow path.

11. The invention set forth in claim 10 together with:
    heating element means associated with said housing for heating said material in said bore.

12. An extruder for processing material such as oilseed products, comprising:
    an elongated housing including means forming a cylindrical bore;
    inlet conduit means in communication with said bore;
    a discharge opening in said bore at one end of said bore opposite said inlet conduit means;
    an elongated screw conveyor rotatably disposed in said bore, said conveyor comprising a plurality of thread portions of different pitch, the pitch of respective ones of said thread portions decreasing progressively toward said one end of said bore to provide progressively greater compaction of material being conveyed toward said discharge opening;

heating element means disposed on said housing for heating material as it is being conveyed through said bore by said conveyor; and passage means in said housing opening into said bore at a point on said housing between said heating element means and said one end of said bore for draining liquid extracted from said material after preheating of said material by said heating element means.

* * * * *